United States Patent
Filsfils et al.

(10) Patent No.: US 9,319,312 B2
(45) Date of Patent: Apr. 19, 2016

(54) SEGMENT ROUTING MAPPING SERVER FOR LDP/SR INTEROPERABILITY

(71) Applicant: Cisco Technology, Inc., San Jose, CA (US)

(72) Inventors: Clarence Filsfils, Brussels (BE); Stefano B. Previdi, Rome (IT); Steven W. Ulrich, Minneapolis, MN (US); Ahmed R. Bashandy, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 71 days.

(21) Appl. No.: 14/279,659

(22) Filed: May 16, 2014

(65) Prior Publication Data

US 2014/0341222 A1   Nov. 20, 2014

Related U.S. Application Data

(60) Provisional application No. 61/824,696, filed on May 17, 2013.

(51) Int. Cl.
| | | |
|---|---|---|
| *H04L 12/28* | (2006.01) | |
| *H04L 12/723* | (2013.01) | |
| *H04L 12/715* | (2013.01) | |

(52) U.S. Cl.
CPC ............. *H04L 45/507* (2013.01); *H04L 45/50* (2013.01); *H04L 45/04* (2013.01)

(58) Field of Classification Search
None
See application file for complete search history.

(56) References Cited

U.S. PATENT DOCUMENTS

| | | | |
|---|---|---|---|
| 6,374,303 B1 | 4/2002 | Armitage et al. | 709/242 |
| 6,647,428 B1 | 11/2003 | Bannai et al. | 709/245 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Aswood Smith | 398/51 |
| 7,061,921 B1 | 6/2006 | Sheth | 370/395.52 |
| 7,068,654 B1 | 6/2006 | Joseph et al. | 370/392 |
| 7,072,346 B2 | 7/2006 | Hama | 370/395.53 |
| 7,088,721 B1 | 8/2006 | Droz et al. | 370/395.1 |
| 7,174,387 B1 | 2/2007 | Shand et al. | 709/238 |
| 7,260,097 B2 | 8/2007 | Casey | 370/392 |
| 7,359,377 B1 | 4/2008 | Kompella et al. | 370/389 |
| 7,430,210 B2 | 9/2008 | Havala et al. | 370/395.53 |
| 7,466,661 B1 | 12/2008 | Previdi et al. | 370/254 |
| 7,471,669 B1 | 12/2008 | Sabesan et al. | 370/351 |

(Continued)

OTHER PUBLICATIONS

Aggarwal, R. and Y. Rekhter, Juniper Networks; E. Rosen, Cisco Systems, Inc.; "MPLA Upstream Label Assignment and Context Specific Label Space;" Network Working Group; Internet Draft; Jan. 2005; pp. 1-8.

(Continued)

*Primary Examiner* — Anh-Vu Ly
(74) *Attorney, Agent, or Firm* — Campbell Stephenson LLP

(57) ABSTRACT

An apparatus and method for enabling interoperability of segment routing (SR) enabled nodes and LDP enabled nodes in a network domain. In one embodiment, the method may include mapping a first node identifier (ID) to a first segment ID in memory, wherein the first node ID uniquely identifies a first node within a network domain, and wherein the first node is not SR enabled. A message is generated and subsequently transmitted directly or indirectly to another node within the network domain, wherein the message comprises the first node ID mapped to the first segment ID, and wherein the other node is SR enabled.

20 Claims, 6 Drawing Sheets

(56) References Cited

U.S. PATENT DOCUMENTS

| | | | |
|---|---|---|---|
| 7,564,803 B1 | 7/2009 | Minei et al. | 370/254 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 8,064,441 B2 | 11/2011 | Wijnands et al. | 370/389 |
| 8,422,514 B1 | 4/2013 | Kothari et al. | 370/466 |
| 8,542,706 B2 | 9/2013 | Wang et al. | 370/474 |
| 8,792,384 B2 | 7/2014 | Banerjee et al. | 370/254 |
| 9,036,474 B2 | 5/2015 | Dibirdi et al. | 370/235 |
| 9,049,233 B2 * | 6/2015 | Frost | H04L 69/166 |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0126272 A1 | 7/2003 | Corl et al. | 709/230 |
| 2003/0142674 A1 | 7/2003 | Casey | 370/393 |
| 2004/0160958 A1 | 8/2004 | Oh | 370/395.1 |
| 2004/0174879 A1 | 9/2004 | Basso et al. | 370/392 |
| 2004/0196840 A1 | 10/2004 | Amrutur et al. | 370/389 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0080421 A1 | 4/2006 | Hu | 709/223 |
| 2006/0274716 A1 | 12/2006 | Oswal et al. | 370/349 |
| 2007/0019647 A1 | 1/2007 | Roy et al. | 370/392 |
| 2007/0058638 A1 | 3/2007 | Guichard et al. | 370/395.31 |
| 2007/0189291 A1 | 8/2007 | Tian | 370/390 |
| 2008/0002699 A1 | 1/2008 | Rajsic | 370/392 |
| 2008/0075016 A1 | 3/2008 | Ashwood-Smith | 370/252 |
| 2008/0084881 A1 | 4/2008 | Dharwadkar et al. | 370/392 |
| 2008/0101227 A1 | 5/2008 | Fujita et al. | 370/232 |
| 2008/0101239 A1 | 5/2008 | Good | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2009/0135815 A1 | 5/2009 | Pacella | 370/389 |
| 2010/0063983 A1 | 3/2010 | Groarke et al. | 707/803 |
| 2010/0124231 A1 | 5/2010 | Kompella | 370/ |
| 2010/0142548 A1 | 6/2010 | Sheth | 370/410 |
| 2010/0220739 A1 | 9/2010 | Ishiguro | 370/104 |
| 2010/0232435 A1 | 9/2010 | Jabr | 370/392 |
| 2010/0284309 A1 | 11/2010 | Allan et al. | 370/256 |
| 2011/0268114 A1 | 11/2011 | Wijnands et al. | 370/389 |
| 2011/0280123 A1 | 11/2011 | Wijnands et al. | 370/228 |
| 2012/0044944 A1 | 2/2012 | Kotha et al. | 370/401 |
| 2012/0069740 A1 | 3/2012 | Lu et al. | 370/238 |
| 2012/0069845 A1 | 3/2012 | Carnet et al. | 370/392 |
| 2012/0082034 A1 | 4/2012 | Vasseur | 370/235 |
| 2012/0120808 A1 | 5/2012 | Nandagopal et al. | 370/238 |
| 2012/0213225 A1 | 8/2012 | Subramanian et al. | 370/392 |
| 2013/0003728 A1 | 1/2013 | Kwong et al. | 370/389 |
| 2013/0077626 A1 | 3/2013 | Keesara et al. | 370/390 |
| 2013/0188634 A1 | 7/2013 | Magee | 370/389 |
| 2013/0266013 A1 | 10/2013 | Dutta et al. | 370/392 |
| 2013/0343204 A1 | 12/2013 | Geib et al. | 370/248 |
| 2014/0098675 A1 | 4/2014 | Frost et al. | 370/241.1 |
| 2014/0169370 A1 | 6/2014 | Filsfils et al. | 370/392 |
| 2014/0177638 A1 | 6/2014 | Bragg et al. | 370/395.3 |
| 2014/0254596 A1 | 9/2014 | Filsfils et al. | 370/392 |
| 2014/0269266 A1 | 9/2014 | Filsfils et al. | 370/228 |
| 2014/0269421 A1 | 9/2014 | Previdi et al. | 370/254 |
| 2014/0269698 A1 | 9/2014 | Filsfils et al. | 370/389 |
| 2014/0269699 A1 | 9/2014 | Filsfils et al. | 370/389 |
| 2014/0269721 A1 | 9/2014 | Bashandy | 370/392 |
| 2014/0269725 A1 | 9/2014 | Filsfils et al. | 370/392 |
| 2014/0269727 A1 | 9/2014 | Filsfils et al. | 370/392 |
| 2014/0286195 A1 | 9/2014 | Fedyk | 370/254 |
| 2014/0317259 A1 | 10/2014 | Previdi et al. | 709/223 |
| 2014/0369356 A1 | 12/2014 | Bryant et al. | 370/392 |

OTHER PUBLICATIONS

Awduche, Daniel O., et al., "RSVP-TE: Extensions to RSVP for LSP Tunnels," Network Working Group, Internet-Draft, Feb. 2001, pp. 1-12.

Awduche, Daniel O., et al., "RSVP-TE: Extensions to RSVP for LSP Tunnels," Network Working Group, Request for Comments 3209, Dec. 2001, pp. 1-61.

Backes, P. and Rudiger Geib, "Deutsche Telekom AG's Statement About IPR Related to Draft-Geig-Spring-OAM-Usecase-01," Aug. 23, 2012, pp. 1-2.

Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.

Bryant, S., et al., Cisco Systems, "Remote LFA FRR," draft-ietf-rtgwg-remote-1fa-04, Network Working Group, Internet-Draft, Nov. 22, 2013, pp. 1-24.

Crabbe, E., et al., "PCEP Extensions for MPLS-TE LSP Protection With Stateful PCE Draft-Crabbe-PCE-Stateful-PCT-Protection-00," Network Working Group, Internet-Draft, Apr. 2013, pp. 1-12.

Crabbe, E., et al., Stateful PCE Extensions for MPLS-TE LSPs, draft-crabbe-pce-statement-pce-mpls-te-00; Network Working Group, Internet- Draft, Apr. 15, 2013, pp. 1-15.

Deering, S., et al., Cisco, Internet Protocol, Version 6 (IPv6) Specification, Network Working Group, Request for Comments 2460, Dec. 1998, pp. 1-39.

Farrel, A., et al., Old Dog Consulting, A Path Computation Element (PCE)-Based Architecture, Network Working Group, Request for Comments 4655, Aug. 2006, pp. 1-80.

Farrel, A., et al., Old Dog Consulting, Inter-Domain MPLS and GMPLS Traffic Enginerring-Resource Reservation Protocol—Traffic Enginerring (RSVP-TE) Extensions, Newtork Working Group, Request for Comments 5151, Feb. 2008.

Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.

Filsfils, C., et al., Cisco Systems, Inc., "Segment Routing Architecture," draft-filsfils-rtgwg-segment-routing-00, pp. 1-28, Dec. 30, 2014.

Filsfils, C., et al., Cisco Sytems, Inc., "Segment Routing Architecture," draft-filsfils-rtgwg-segment-routing-01, Network Working Group, Internet-Draft, Oct. 21, 2013, pp. 1-28.

Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.

Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-17.

Frost, D., et al., Cisco Systems, Inc., "MPLS Generic Associated Channel (G-Ach) Advertisement Protocol," Request for Comments 7212, Jun. 2014, pp. 1-23.

Geib, R., "Segment Routing Based OAM Use Case,"IETF 87, Gerlin, Jul./Aug. 2013, pp. 1-3.

Geib, R., Deutsch Telekom, "Use Case for a Scalable and Topology Aware MPLS data plan moniotoring System," draft-geib-spring-oam-usecase-00; Internet-Draft, Oct. 17, 2013, pp. 1-11.

Geib, R., Deutsch Telekom, "Use Case for a Scalable and Topology Aware MPLS data plan moniotoring System," draft-geib-spring-oam-usecase-01; Internet-Draft, Feb. 5, 2014, pp. 1-10.

Gredler, H., et al., Juniper Networks, Inc., "Advertising MPLS Labels in IS-IS draft-gredler-isis-label-advertisement-00," Internet-Draft; Apr. 5, 2013; pp. 1-13.

Gredler, H. et al., hannes@juniper.net, IETF87, Berlin, "Advertising MPLS LSPs in the IGP," draft-gredler-ospf-label-advertisement, May 21, 2013; pp. 1-14.

Guilbaud, Nicolas and Ross Cartlidge, "Google~Localizing Packet Loss in a Large Complex Network," Feb. 5, 2013, pp. 1-43.

Imaizumi, H., et al.; Networks, 2005; "FMEHR: An Alternative Approach to Multi-Path Forwarding on Packed Switched Networks," pp. 198-201.

(56) References Cited

OTHER PUBLICATIONS

Kompella, K. et al, Juniper Networks, "Label Switched Paths (LSP) Hierarchy with Generalized Multi-Protocol Label Switching (GMPLS) Traffic Enginerring (TE)," Network Working Group, Request for Comments 4206, Oct. 2005, pp. 1-14.

Kompella, K., et al., Juniper Networks, Inc., "Detecting Multi-Protocol Label Switched (MPLS) Data Plane Failures," Network Working Group, Request for Comments 4379, Feb. 2006, pp. 1-50.

Kompella, K. et al., Juniper Networks,"Virtual Private LAN Service (VPLS) Using BGP for Auto-Discovery and Signaling," Network Working Group, Request for Comments 4761, Jan. 2007, pp. 1-28.

Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.

Kumar, N. et al, "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.

Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.

Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.

Raszuk, R., NTT I3, "MPLS Domain Wide Labels," draft-raszuk-mpls-domain-wide-labels-00, MPLS Working Group, Internet-Draft, Jul. 14, 2013, pp. 1-6.

Rosen, E. et al., Cisco Systems, Inc., "BGP/MPLS VPNs", Network Working Group, Request for Comments: 2547; Mar. 1999, pp. 1-26.

Sivabalan, S., et al.; "PCE-Initiated Traffic Engineering Path Setup in Segment Routed Networks; draft-sivabalan-pce-segmentrouting-00. txt," Internet Engineering Task Force, IETF; Standard Working Draft, Internet Society (ISOC) 4, Rue Des Falaises CH-1205, Geneva, Switzerland, Jun. 2013, pp. 1-16.

Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.

Vasseur, JP, et al.; Cisco Systems, Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.

Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.

Filsfils, C. et al., Cisco Systems, Inc., "Segment Routing Interoperability with LDP", draft-filsfils-spring-segment-routing-ldp-interop-01.txt; Apr. 18, 2014, pp. 1-16.

Francois, Pierre Jean Rene; "Loop Avoidance During Network Convergence in Switched Networks"; U.S. Appl. No. 14/319,353, filed Jun. 30, 2014; consisting of Specification, Claims and Abstract (29 pages); and Drawings (6 sheets).

Previdi, Stefano B.; "Segment Routing Using a Remote Forwarding Adjacency Identifier"; U.S. Appl. No. 14/334,300, filed Jul. 17, 2014; consisting of Specification, Claims and Abstract (23 pages); and Drawings (8 sheets).

Previdi, Stefano B; "Segment Routing Extension Headers"; U.S. Appl. No. 14/212,084, filed Mar. 14, 2014; consisting of Specification, Claims and Abstract (43 pages); and Drawings (17 sheets).

CISCO Systems, Inc., "Introduction to Intermediate System-to-Intermediate System Protocol," published 1992-2002; pp. 1-25.

Eckert, T., "Traffic Engineering for Bit Index Explicit Replication BIER-TE, draft-eckert-bier-te-arch-00," Network Working Group, Internet-Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.

Eckert, Toerless et al., "Traffic Engineering for Bit Indexed Explicit Replication", U.S. Appl. No. 14/814,575, filed Jul. 31, 2015; consisting of Specification, Claims, and Abstract (75 pages); and Drawings (18 sheets).

Eckert, Toerless et al., "Traffic Engineering for Bit Indexed Explicit Replication", U.S. Appl. No. 14/862,915, filed Sep. 23, 2015; consisting of Specification, Claims, and Abstract (75 pages); and Drawings (18 sheets).

\* cited by examiner

| Type | Length | F=1  S=0  O=0  R=0 |
|---|---|---|
| D = 9.9.9.1 |||
| Nodal-Segment ID = 76 |||
| E=9.9.9.2 |||
| Nodal-Segment ID = 78 |||
| H=9.9.9.3 |||
| Nodal-Segment ID = 80 |||

*FIG. 5A*

| Type | Length | F=1  S=0  O=0  R=1 |
|---|---|---|
| Start D = 9.9.9.1 |||
| End H = 9.9.9.3 |||
| Start Nodal-Segment ID = 76 |||
| Start Nodal-Segment ID = 80 |||

*FIG. 5B*

SEGMENT ROUTING MAPPING SERVER FOR LDP/SR INTEROPERABILITY

RELATED APPLICATIONS

This application claims the domestic benefit under Title 35 of the United States Code §119(e) of U.S. Provisional Patent Application Ser. No. 61/824,696, entitled "Segment Routing Mapping Server for LDP/SR Interoperability," filed May 17, 2013, and naming Clarence Filsfils, Stefano B. Previdi, and Steven W. Ulrich as the inventors, which is hereby incorporated by reference in its entirety and for all purposes as if completely and fully set forth herein.

BACKGROUND

Network nodes receive and subsequently forward packets towards their destinations. Packet forwarding requires a decision process that, while simple in concept, can be complex. Since packet forwarding decisions are handled by network nodes, the total time required for this can become a major limiting factor in overall network performance. Network nodes may take form in one or more routers, one or more bridges, one or more switches, one or more servers, or any other suitable communications processing device. A packet is a formatted unit of data that typically contains control information and payload data. Control information may include: source and destination IP addresses, error detection codes like checksums, sequencing information, etc. Control information is typically found in packet headers and trailers, with payload data in between.

Multiprotocol label switching (MPLS) is one packet forwarding mechanism. MPLS Nodes can make packet forwarding decisions based on label distribution protocol (LDP) distributed labels and LDP forwarding tables. LDP is a process in which network nodes exchange LDP labels (hereinafter labels) when creating label switched paths (LSPs) of nodes through which packets traverse a network. Packet forwarding based on labels stands in stark contrast to traditional Internet Protocol (IP) routing in which packet forwarding decisions are made by nodes using IP addresses contained within packets.

BRIEF DESCRIPTION OF THE DRAWINGS

The present disclosure may be better understood, and its numerous objects, features, and advantages made apparent to those skilled in the art by referencing the accompanying drawings.

FIGS. 5A and 5B illustrate example mapping advertisements generated and sent by the SR mapping node shown in FIG. 4.

DETAILED DESCRIPTION

1. Overview

Figure 1:
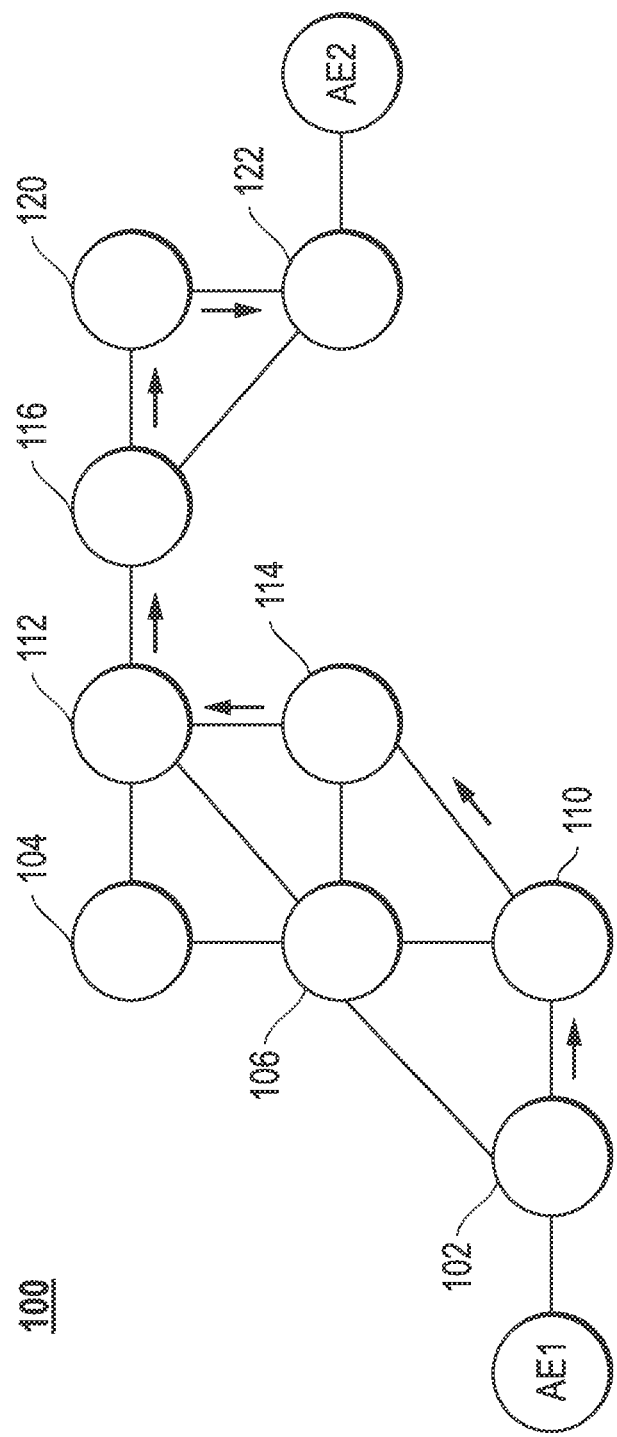
FIG. 1 is a block diagram illustrating certain components of an example network.

An apparatus and method is disclosed that enables interoperability of segment routing (SR) enabled nodes and LDP enabled nodes in a network domain. In one embodiment, the method may include mapping a first node identifier (ID) to a first segment ID in memory, wherein the first node ID uniquely identifies a first node within a network domain, and wherein the first node is not SR enabled. A message is generated and subsequently transmitted directly or indirectly to another node within the network domain, wherein the message comprises the first node ID mapped to the first segment ID, and wherein the other node is SR enabled.

2. Packet Forwarding Mechanisms

IP routing and MPLS are distinct packet forwarding mechanisms. IP routing relies on IP addresses inside packet headers to make packet forwarding decisions. In contrast, MPLS implements packet forwarding decisions are typically based on short path identifiers called labels that are attached to packets. Segment routing (SR) is yet another packet forwarding mechanism. SR is similar to and employs many of the MPLS data plane functions. Like MPLS, packet forwarding decisions in SR can be based on short path identifiers called segment IDs attached to packets. While SR and MPLS are similar, substantial differences exist between SR and MPLS as will be more fully described below.

2.1 IP Packet Routing

IP packet routing uses IP forwarding tables, which are created by nodes using routing information distributed between nodes via one or more protocols like the internal gateway protocol (IGP). In simple terms, IP forwarding tables map destination IP addresses to next hops that packets should take to reach their destinations. When a node receives a packet, the node can access a forwarding table using the packet's destination IP address and lookup a corresponding egress interface to the next hop. The node then forwards the packet through the egress interface. The next hop node performs its own forwarding table lookup using the same destination IP address in the packet, and so on.

2.2 MPLS and LDP

MPLS is commonly employed in provider networks consisting of interconnected LDP nodes. For purposes of explanation, LDP nodes are those nodes that implement LDP in the control plane. A stream of packets enters the network via an ingress edge LDP node, travels hop-by-hop along an LSP that typically includes one or more core LDP nodes, and exits via an egress edge LDP node.

Packets are forwarded along an LSP based on LDP forwarding tables and labels. Labels allow for the use of very fast and simple forwarding engines in the data planes of nodes. A label is a short, fixed-length, locally significant identifier that can be associated with a forwarding equivalence class (FEC). Packets received at an ingress node and associated with the same FEC should follow the same LSP through the network. LSPs can be established for a variety of purposes, such as to guarantee a certain level of performance when transmitting packets, to forward packets around network congestion, to create tunnels for network-based virtual private networks, etc. In many ways, LSPs are no different than circuit-switched paths in ATM or Frame Relay networks, except that they are not dependent on a particular Layer 2 technology.

LDP is employed in node control planes. Two LDP nodes, called LDP peers, can bi-directionally exchange labels on a FEC by FEC basis. LDP is used in a process of building and maintaining LDP forwarding tables that map labels to next hop egress interfaces. These forwarding tables can be used to forward packets as more fully described below.

When a packet is received by an ingress LDP node of an MPLS network, the node may use information in the packet to determine a FEC corresponding to an LSP the packet can take across the network to reach the packet's destination IP address. In one embodiment, the FEC is a unique identifier of the egress node that is closest to the packet's destination IP address. In this embodiment, the FEC may take form in the egress node's loopback address (hereinafter loopback).

Characteristics for determining the FEC for a packet can vary, but typically the determination is based on the packet's destination IP address. Quality of Service for the packet or other information may also be used to determine the FEC. Once determined, the ingress LDP node can access a table to select a label that is mapped to the FEC. The table may also map a next hop egress interface to the FEC. Before the ingress LDP node forwards the packet to the next hop via, the ingress node attaches the label.

When an LDP node receives a packet with an attached label (i.e., the incoming label), the node accesses its LDP forwarding table to read a next hop egress interface and another label (i.e., an outgoing label), both of which are mapped to the incoming label. Before the packet is forwarded via the egress interface, the LDP node swaps the incoming label with the outgoing label. The next hop receives the packet with label and may perform the same process. This process is often called hop-by-hop forwarding along a non-explicit path (i.e., the LSP). The penultimate node in the LSP may pop the incoming label before forwarding the packet to an egress LDP node in the network, which in turn may forward the packet towards its destination using the packet's destination address and an IP forwarding table. In another embodiment, the egress LDP node may pop the incoming label before forwarding the packet using the destination address and an IP forwarding table.

To illustrate the foregoing aspects, FIG. 1 shows a portion of an example network 100 that includes LDP nodes 102-122 coupled together via communication links. An LSP from node 102 to node 122 can be created so that all packets of a stream associated with a particular FEC sent from node 102 to node 122 will travel through the same set of nodes. Each LDP node maintains information for the LSP established through it in an LDP forwarding table. Thus, if node 110 knows that node 114 is the next hop along the LSP for all packets received from node 102 that are destined for node 122, node 110 can forward the packets to node 114.

2.3 Segment Routing

Segment routing (SR) is a mechanism in which nodes forward packets using SR forwarding tables and segment IDs. Like MPLS, SR enables very fast and simple forwarding engines in the data plane of nodes. SR is not dependent on a particular Open Systems Interconnection (OSI) model data link layer technology to forward packets.

In general, a stream of packets headed to the same destination, enters an SR enabled network (i.e., a provider network of nodes that are SR enabled) via an ingress edge SR node, travels hop-by-hop along a segment path (SP) that includes one or more core SR nodes, and exits the network via an egress edge SR node.

SR nodes (i.e., nodes employing SR) make packet forwarding decisions based on segment IDs as opposed to LDP distributed labels, and as a result SR nodes need not employ LDP in their control planes. The range for segment IDs may be distinct from the range for labels. Unless otherwise indicated, SR nodes lack LDP in their control plane.

Like labels, segment IDs are short (relative to the length of an IP address or a FEC), fixed-length identifiers. In one embodiment, segment IDs are shorter than labels. Segment IDs may correspond to topological segments of a network, services provided at network nodes, etc. A topological segment represents a one hop or multi hop path to an SR node. Topological segments can act as sub-paths that can be combined to form an SP. As will be more fully described below, stacks of segment IDs can represent SPs, and SPs can be associated with FECs.

There are several types of segment IDs including nodal-segment IDs, adjacency-segment IDs, etc. Nodal-segment IDs are assigned to SR nodes so that no two SR nodes belonging to a network domain are assigned the same nodal-segment ID. Nodal-segment IDs are typically mapped to unique node identifiers, and each SR node typically stores its nodal-segment ID/unique node identifier in memory. For purposes of explanation only, unique node identifiers will take form in node loopback addresses (hereinafter node loopbacks). In one embodiment, all assigned nodal-segment IDs are selected from a predefined ID range (e.g., [32, 5000]). A nodal-segment ID enables one-hop or multi-hop, shortest path (SPT) packet forwarding to an SR node assigned the nodal-segment ID as will be more fully described below.

An adjacency-segment ID represents a direct link between adjacent SR nodes in a network. Links can be uniquely identified. For purposes of explanation only, this disclosure will identify a link using the loopbacks of nodes between which the link is positioned. For a link between two nodes identified by node loopback X and node loopback Y, the link is identified herein as link XY. Because loopbacks are unique, link IDs are unique. Link IDs should not be confused with adjacency-segment IDs; adjacency-segment IDs may not be unique within a network. This disclosure will presume that only one link exists between nodes in a network, it being understood the disclosure should not be limited thereto.

Each SR node can assign a distinct adjacency-segment ID for each of the node's links to neighbor SR nodes. Adjacency-segment IDs are locally significant; separate SR nodes may assign the same adjacency-segment ID, but the adjacency-segment ID represents distinct links. In one embodiment, adjacency-segment IDs are selected from a predefined range that is outside the predefined range for nodal-segment IDs or labels.

SR nodes can advertise routing information including nodal-segment IDs bound to loopbacks, adjacency-segment IDs mapped to link IDs, etc., using protocols such as IGP with SR extension. In general nodes, including SR nodes, can use routing information they receive to create topology maps of the provider network in which they are contained. In general topology maps can be used to create or update forwarding tables including SR and LDP forwarding tables. A node can use the topology map it creates to identify next hop egress interfaces for shortest paths (SPTs) to respective nodes in the network domain using the nodes' loopbacks. SPT or next hop egress interfaces for loopbacks can be mapped to respective nodal-segment IDs in, for example, an SR forwarding table. SR nodes can also map their adjacency-segment IDs to egress interfaces for respective links in SR forwarding tables. Because adjacency-segment IDs are locally significant, however, adjacency-segment IDs should only be mapped in SR forwarding tables of the nodes that advertise the adjacency-segment IDs. In other words, an SR node that advertises an adjacency-segment ID should be the only node in the network area that has a SR forwarding table that maps the adjacency-segment ID to an egress interface.

As noted above, SR enables segment paths (SPs) through a network. SPs can be associated with FECs. Packets received at an ingress SR node and associated with the same FEC normally traverse the same SP towards their destination. Nodes in SPs make forwarding decisions based on segment IDs, not based on the contents (e.g., destination IP addresses) of packets.

SR ingress nodes and/or other devices (e.g., a path computation node) can use advertised routing information (nodal-segment IDs bound to loopbacks, adjacency-segment IDs mapped to link IDs, etc.) and topological maps to create ordered lists of segment IDs (i.e., segment ID stacks). Segment ID stacks correspond to respective SPs. Individual segment IDs in a stack may correspond to respective segments or sub paths of a corresponding SP. A stack may contain a single segment ID (e.g., a nodal-segment ID).

When an ingress edge SR node receives a packet, the node or a path computation element on request, can select an SP for the packet based on information contained in the packet. In one embodiment, a FEC may be determined for the packet using the packet's destination address. This FEC may take form in an identifier (e.g., loopback) of the egress node that is closest to the destination IP address of the received packet. The FEC is then used to select a segment ID stack mapped thereto in memory. The ingress node can attach the selected segment ID stack. A header with the segment stack may be employed. The packet with attached stack is subsequently forwarded along and traverses the segments of the SP in an order that corresponds to the list order of the segment IDs in the stack. A forwarding engine operating in the data plane of each SR node, can use the top segment ID within the stack to access an SR forwarding table and lookup the egress interface for next hop. As the packet and attached segment ID stack are forwarded along the SP in a hop-by-hop fashion, segment IDs can be popped off the top of the stack. In another embodiment, the attached stack of segment IDs remains unchanged as the packet is forwarded along the SP. In this embodiment, a pointer to an active segment ID in the stack can be advanced as the packet is forwarded along the SP. In contrast to MPLS described above, however, segment IDs are not normally swapped as the packet and attached segment ID stack are forwarded along the SP.

Figure 2:
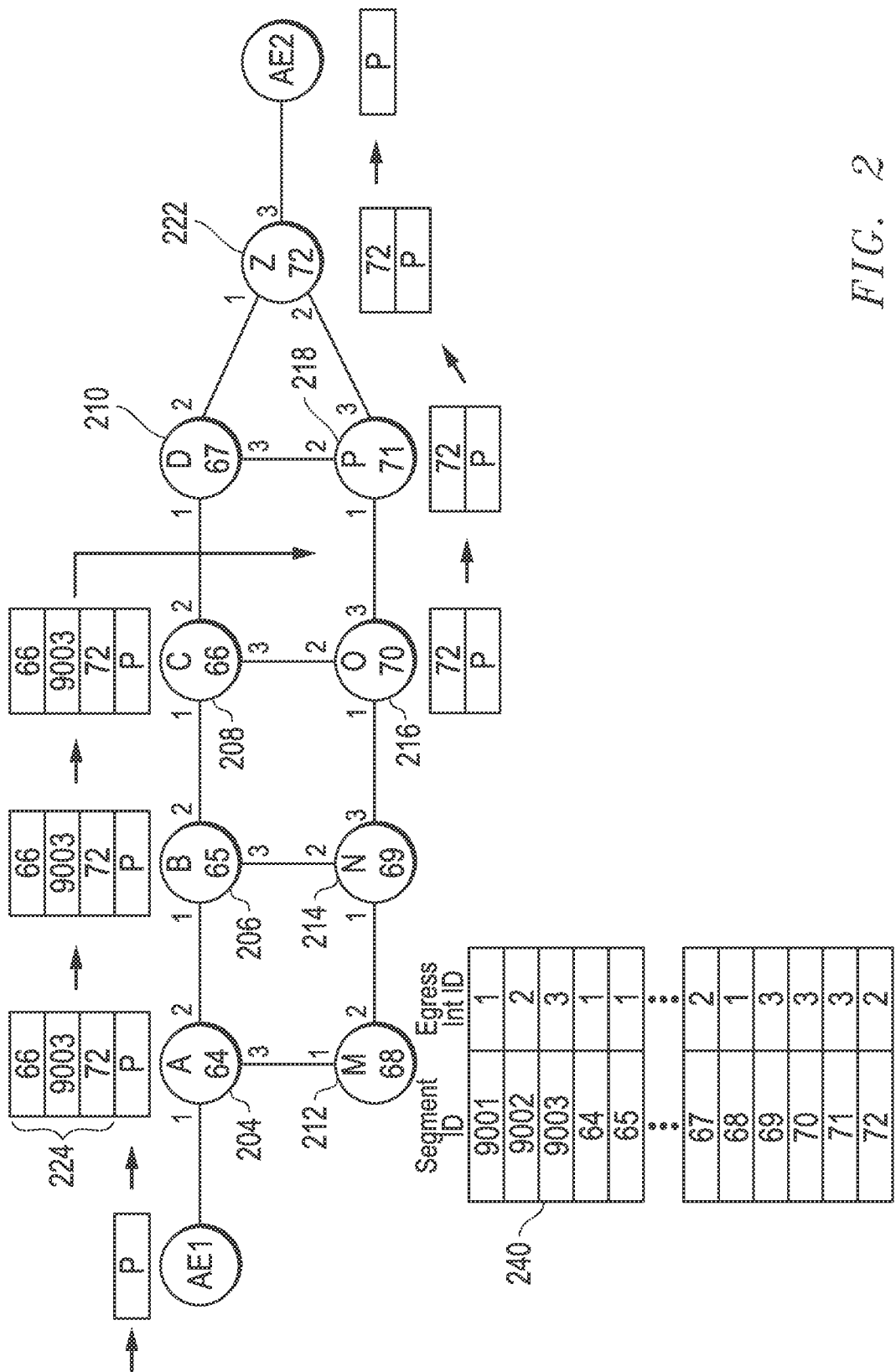
FIG. 2 is a block diagram illustrating certain components of an example network.

To illustrate general concepts of SR, FIG. 2 shows a portion of an example SR enabled provider network 202 that is in data communication with nodes AE1 and AE2. Network 202 consists of SR nodes 204-222. Nodes 204-210 are assigned unique nodal-segment IDs 64-67, respectively, nodes 212-218 are assigned unique nodal-segment IDs 68-71, respectively, and node 222 is assigned unique nodal-segment ID of 72. Each of the SR nodes 204-222 have interfaces that are identified as shown. For example, node 204 has three interfaces designated 1-3, respectively. Each of the nodes 204-222 is assigned a unique loopback. Loopbacks A-D are assigned to nodes 204-210, respectively, loopbacks M-P are assigned to nodes 212-218 respectively, and loopback Z is assigned to node 222. These loopbacks are unique in the network and can be used for several purposes such as calculating the topology of network 202, which in turn can be used to create SPs and/or to identify SPTs and thus next hop egress interfaces for SR forwarding tables. Nodes 204-222 can also assign locally significant adjacency-segment IDs. For example, node 208 can assign adjacency-segment IDs 9001-9003 to links CB, CD, and CO, respectively.

Each of SR nodes 204-222 can advertise routing information to the other nodes in network 202 using IGP with SR extension. For example, node 208 can generate and send one or more advertisements that include adjacency-segment IDs 9001-9003 bound to link IDs CB, CD, and CO, respectively, and nodal-segment ID 66 bound to loopback C. One of ordinary skill understands that advertisements may contain additional information. Using the advertisements they receive, nodes 204-222 can generate respective SR forwarding tables for use in the data planes. For example, node 208 can generate example SR forwarding table 240 that maps adjacency-segment IDs 9001-9003 to node interface IDs 1-3, respectively, and nodal-segment IDs such as 64, 65, 67, 70, and 72, to node 208 interfaces 1, 1, 2, 3, and 2, respectively, which are the SPT next hop egress interfaces determined by node 208 for loopbacks A, B, D, O, and Z respectively. It is noted that in the embodiment shown, only SR forwarding table 240 maps adjacency-segment IDs 9001-9003 to interfaces; SR forwarding tables in the other nodes of network 202 should not map adjacency-segment IDs 9001-9003.

In addition to creating SR forwarding tables, SR nodes or a path computation node (not shown) can create segment ID stacks for respective SPs. For example, ingress SR node 204 creates example segment ID stack 224 for an SP between ingress edge node 204 and egress edge node 222. Example segment stack 224 can be created for a particular FEC (e.g., FEC Z). Example stack 224 includes three segment IDs: nodal-segment IDs 66 and 72 advertised by nodes 208 and 222, respectively, and adjacency-segment ID 9003 advertised by node 208. Stack 224 corresponds to an SP in which packets flow in order through nodes 204, 206, 208, 216, 218, and 222.

In response to receiving a packet P that is destined for a device that can be reached via AE2, which in turn can be reached via node 222, SR node 204 can select a segment ID stack based on information contained in the packet. For example, node 204 can select FEC Z (i.e., the loopback for node 222) for packet P based on the destination IP address in packet P and/or other information. FEC Z is mapped to example stack 224 in a table not shown. Node 204 attaches stack 224 to packet P. Example segment stack 224 lists segment IDs that correspond to one hop and multi hop segments that packets traverse to reach egress node 222. The one hop and multi hop segments collectively form the SP corresponding to stack 224. Once the segment stack 224 is attached to packet P, ingress SR enable node 204 may access a SR forwarding table (not shown) using the top segment ID (e.g., segment ID=66) to read egress interface identifier 2, which is the next hop egress interface for the SPT to the SR node assigned nodal-segment ID 66.

Figure 3:
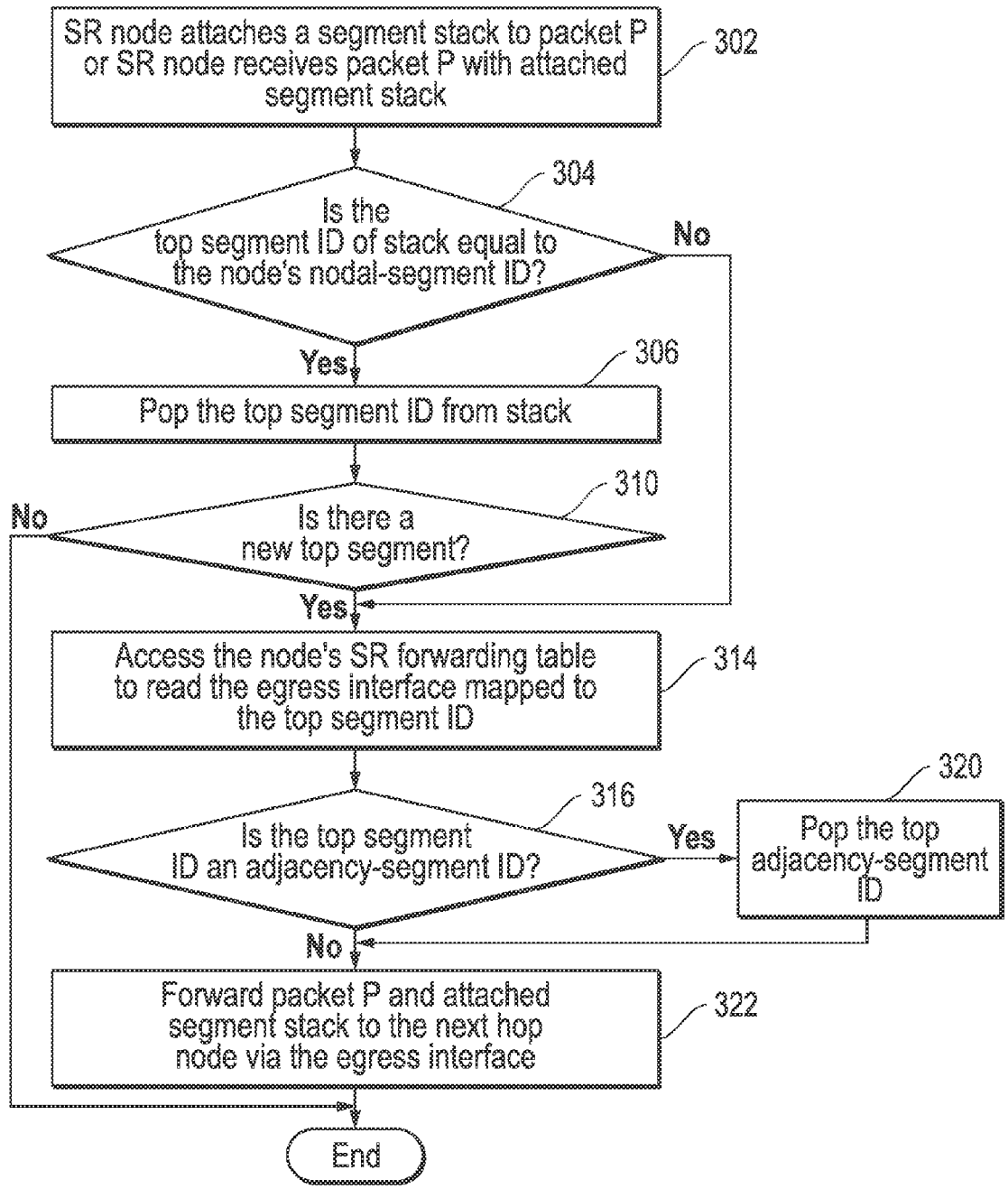
FIG. 3 is a flow chart illustrating an example process employed by a node of FIG. 2.

With continuing reference to FIG. 2, FIG. 3 illustrates example process of packet forwarding using segment IDs according to one embodiment. More particularly, FIG. 3 illustrates an example method performed by an SR node, including an edge node, in a network like that shown in FIG. 2. In response to receiving a packet with an attached segment ID stack, or in response to attaching a segment ID stack to a packet, the SR node determines in step 304 whether the top segment ID of the stack matches the nodal-segment ID assigned to the SR node. If there is a match, the process proceeds to step 306 where the SR node pops the top segment ID, which may expose an underlying segment ID as the new top segment ID. If there is no new top segment ID (i.e., the segment popped in 306 was the last segment ID of the stack) the packet P has probably arrived at the egress node, and the process ends. If a new top segment ID is exposed, or if there is no match of segment IDs in step 304, the SR node accesses its SR forwarding table in step 314 to read the egress interface that is mapped to the top segment ID. In step 316 the SR node determines whether the top segment ID is an adjacency-segment ID. This determination can be implemented by simply comparing the top segment ID with the designated range of adjacency-segment IDs that are available for assignment within the network. If the top segment ID is found to be within the designated range, the top segment ID is an adjacency-segment ID and it is popped. In step 322 the SR node forwards packet P and attached stack to the next node via the egress interface identified in step 314.

With continuing reference to FIG. 3, FIG. 2 shows packet P and attached stack 224 as it is forwarded by nodes. As shown, nodes 204 and 206 forward packet P and stack 224 without popping a segment ID. However, node 208 pops nodal-segment ID 66 and adjacency-segment ID 9003 in accordance with steps 306 and 320, respectively, before the packet P and stack 224 are forwarded to node 216 in accordance with step 322. Nodes 216 and 218 forward packet P and stack 224 without popping segment IDs. SR egress edge node 222 recognizes itself as the last hop of the SP. Eventually, node 222 may employ traditional IP routing and forward packet P to access node AE2 based on routing table lookup using the destination IP address within packet P.

3. Hybrid Networks

FIGS. 1 and 2 illustrate example provider networks that contain LDP nodes and SR nodes, respectively. Some providers may want to employ hybrid networks or networks that contain both LDP and SR nodes. Differences in LDP and SR nodes described above, however, present obstacles to hybrid network implementation. For example, an SR node or a path computation node in a hybrid network may be incapable of generating a stack of segment IDs for an SP that ends at an egress LDP node since the LDP node lacks a nodal-segment ID assignment. It may be difficult to transmit a packet with attached segment ID stack along an SP that contains a core LDP since the core LDP node lacks the ability to forward the packet in accordance with the process shown in FIG. 3. An LSP cannot be created between neighbor SR and an LDP nodes since the SR node is incapable of exchanging labels with the LDP node. Additional obstacles are contemplated.

The present disclosure provides methods and apparatuses that can address obstacles to hybrid network implementation. In one embodiment, the disclosure contemplates the use of SR/LDP nodes (i.e., nodes that employ both LDP and SR) positioned directly between SR and LDP nodes. SR/LDP nodes can bridge differences in SPs and LSPs and enable packet transfer therebetween. The disclosure also contemplates use of one or more SR mapping nodes (e.g., a server) within the hybrid network. SR mapping nodes can map segment IDs to respective LDP node loopbacks. SR mapping nodes can also advertise the mappings in messages (hereinafter mapping advertisements) that are sent to other nodes in a hybrid network including the SR and SR/LDP nodes thereof. SR, SR/LDP and path computation nodes can use the mapping advertisements when creating or updating SR forwarding tables, or when creating segment ID stacks for SPs that traverse core LDP nodes and/or egress LDP nodes.

Figure 4:
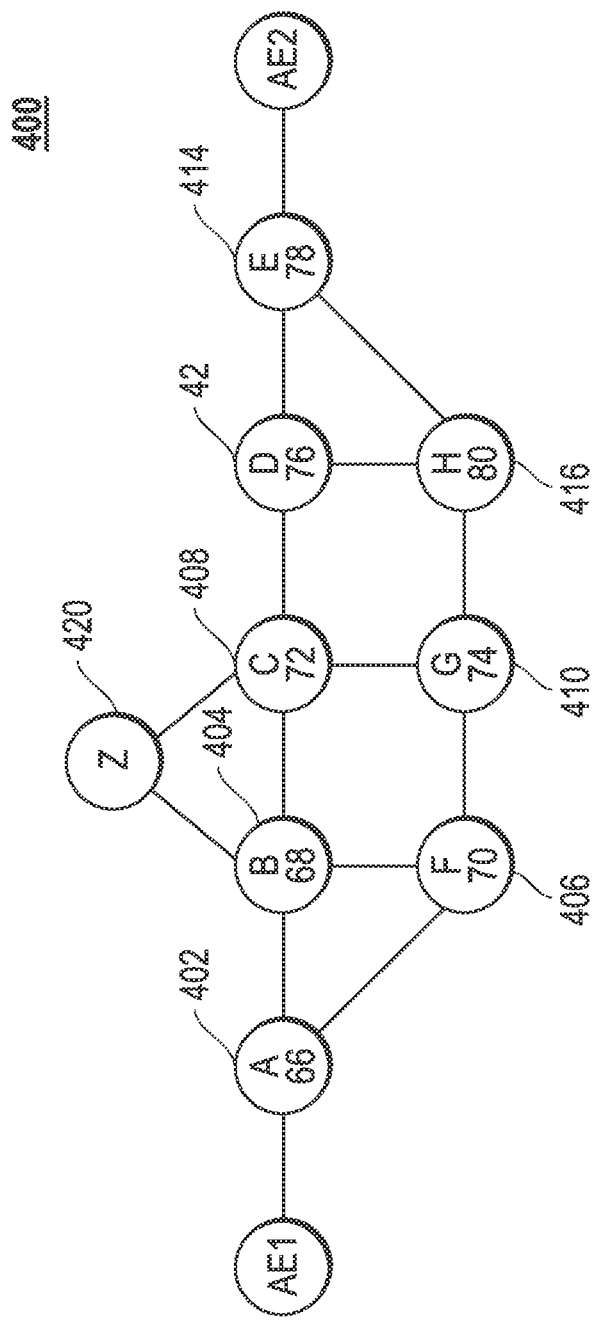
FIG. 4 is a block diagram illustrating certain components of an example network.

FIG. 4 illustrates a portion of an example hybrid network 400 that employs LDP, SR, SR mapping, and SR/LDP nodes. Nodes 402-406 are SR enabled, nodes 408-410 are SR/LDP enabled, and nodes 412-416 are LDP enabled. Additionally, network 400 includes an SR mapping node 420. It is noted that in alternative embodiments, two or more SR mapping nodes can be employed in a network domain like that shown in FIG. 4. In another alternative embodiment, a path computation node can be employed for generating segment ID stacks for use by ingress SR nodes like node 402.

Nodes in network 400 are identified by loopbacks or other unique node identifiers. For example, nodes 402-416 are identified by loopbacks A-H, respectively. In one embodiment, each of the SR and SR/LDP nodes stores a respective nodal-segment ID assigned to it by a network administrator. Nodes 402-410 store assigned nodal-segment IDs 66-74, respectively. LDP nodes do not store nodal-segment IDs, even though FIG. 4 shows LDP nodes 412-414 associated with nodal-segment IDs 76-80. As will be explained, nodal-segment IDs 76-80 are mapped to loopbacks D, E, and H in memory of SR mapping node 420.

In one embodiment SR mapping nodes store tables that directly or indirectly map segment IDs to respective address prefixes. For example, the tables can map segment IDs to loopbacks of SR, LDP, and SR/LDP nodes in a hybrid provider network like that shown in FIG. 4. For purposes of explanation, however, this disclosure will presume that SR mapping node 420 contains a single table in memory that only maps nodal-segment IDs to loopbacks of LDP nodes in network 400. The table can be manually configured by a network administrator.

SR and SR/LDP nodes receive mapping advertisements from the SR mapping node. The mapping advertisements can directly map nodal-segment IDs to respective loopbacks. FIG. 5A illustrates an example mapping advertisement sent by SR mapping node 420 that directly maps nodal-segment IDs 76-80 to loopbacks D, E, and H, respectively. In FIG. 5A, flag F is set to indicate that the node loopbacks are in four octet IPv4 address form. The S flag, when set, indicates the node loopbacks are in sixteen octet IPv6 address form. The O flag, when set, indicates the node loopbacks are in six octet OSI System-ID address form. In another embodiment, the mapping advertisements can indirectly map nodal-segment IDs to loopbacks. FIG. 5B illustrates an example mapping advertisement sent by SR mapping node 420 that indirectly maps nodal-segment IDs 76, 78, and 80 to loopbacks D, E, and H, respectively. In FIG. 5B, the R flag is set to indicate that the nodal-segment IDs (76-80) and loopbacks (D=9.9.9.1, E=9.9.9.2, and H=9.9.9.3) are presented as ranges, e.g., (starting nodal-segment ID=76, ending nodal-segment ID=80; starting loopback=9.9.9.1, ending loopback=9.9.9.3). It is noted that a mapping advertisement may map several ranges of nodal-segment IDs to respective ranges of loopbacks. One of ordinary skill understands that SR and SR/LDP nodes that receive a mapping advertisement like that shown in FIG. 5B, will have to process the ranges to obtain the respective nodal-segment ID/loopback mappings like those shown in FIG. 5A. In yet another embodiment, the loopback and/or nodal-segment ID range can be expressed as a starting loopback or nodal-segment ID followed by an integer I that indicates the number of items in the range. Mapping advertisements that use ranges to map nodal-segment IDs to loopbacks should be smaller in size than mapping advertisements that directly map nodal-segment IDs to respective loopbacks, which in turn may reduce network bandwidth needed to transmit the mapping advertisements.

Nodes in network 400 can use routing information they receive to create or update network topology maps, which in turn can be used to create their respective forwarding tables. In one embodiment, nodes in network 400 may employ IGP to advertise their routing information, including their respective loopbacks, to other nodes. The SR and SR/LDP nodes may extend their IGP advertisements by binding their loopbacks to their respectively assigned nodal-segment IDs. Advertisements originating from the SR and the SR/LDP nodes may also contain additional information, such as information indicating they are SR enabled. In an alternative embodiment, SR mapping node 420 can generate and send a mapping advertisement that maps nodal-segment IDs 66-80 mapped to loopbacks A-E, respectively. In this alternative embodiment, SR and SR/LDP nodes 402-410 need not store or advertise their assigned nodal-segment IDs. LDP nodes 412-416 may receive IGP advertisements from nodes 402-410 that contain SR-related information including segment IDs. LDP nodes 412-416 essentially ignore the SR-related information. LDP nodes 412-416 may also receive mapping advertisements from SR mapping node 420. The LDP nodes may also ignore the mapping advertisements.

The nodes in network 400 can use the routing information they receive from other nodes and/or the SR mapping node 420, to create or update paths and/or forwarding tables that are based on network topology maps. For example, each of LDP and SR/LDP nodes 408-416 can use the routing information they receive to create or update topology maps of network 400, which in turn can be used to create or update LSPs and/or LDP forwarding tables. Similarly, SR and SR/LDP nodes 402-410 can use the routing information they receive to create or update topology maps of network 400, which in turn can be used to create or update SPs and/or SR forwarding tables. Importantly, SR node forwarding tables can include entries that map SPT egress interfaces to nodal-segment IDs for LDP nodes. Thus, using the mapping advertisement received from SR mapping node 420, SR nodes 402-406 create SR forwarding tables, which include entries that map SPT egress interfaces to nodal-segment IDs 76-80, which in turn are assigned to LDP nodes 412-416, respectively. Using the process shown in FIG. 3, SR nodes can forward packets destined for an LDP egress node using the nodal-segment ID assigned thereto. For example, SR core node 404 may receive a packet with a stack containing a single nodal-segment ID (i.e., nodal-segment ID 78) attached to it. Node 404 should include an SR forwarding table that maps nodal-segment ID 78 to an egress interface coupled to node 408. In response to accessing the table in accordance with step 314 of FIG. 3, node 404 reads the egress interface mapped to nodal-segment ID 78, and in step 322 node 404 forwards the packet with attached nodal-segment ID 78 to the next hop via the egress interface.

SR/LDP nodes 408 and 410 can create both SR and LDP forwarding tables. Nodes 408-416 can exchange labels via LDP for use in the LDP forwarding tables, but nodes 402-410 do not exchange labels with each other. SR/LDP nodes 408 and 410 can track their immediate neighbor nodes to identify which are or are not LDP enabled. SR/LDP nodes can bridge the differences between SPs and LSPs and enable packet transfer therebetween. In other words, SR/LDP nodes can act as merge points between LSPs and SPs. To illustrate, ingress LDP node 414 may receive a packet P1, which is destined for device that is reachable via node AE1. In response to receiving packet P1, node 414 may determine a FEC (e.g., loopback A) based upon information such as the packet's destination IP address. Node 414 may then access a table that maps loopback A to a label (e.g., L1). In accordance with the MPLS forwarding mechanism described above, node 414 forwards packet P1 and attached label L1 to the next hop (i.e., LDP node 412) via the egress interface that is also mapped in the table to label L1. When node 414 receives the packet with attached label, node 414 accesses its LDP forwarding table to read label L2, which is mapped to label L1. Node 412 swaps L1 with L2, and forwards packet P1 to SR/LDP nodes 408, which is the last hop of the LSP in the illustrated example. SR/LDP node 408 receives packet P1 with attached label L2, but cannot forward the packet towards its destination via the LSP. Acting as a merge point, however, SR/LDP node 408 can forward packet P1 on an SP corresponding to the LSP. More specifically, SR/LDP node 408 can determine a single nodal-segment ID stack for an SP corresponding to label L2 using the FEC (e.g., loopback A) associated therewith. LDP peers, including SR/LDP node 408 and LDP node 412, exchange labels on a FEC-by-FEC bases during LSP creation in a fashion similar to that described with reference to FIG. 1. During a prior LDP session, SR/LDP node 408 gave label L2 to LDP node 412 when LDP node 412 requested a label associated with loopback A, and SR/LDP node 408 mapped label L2 to loopback A in memory. During a prior exchange of routing information, SR/LDP node 408 received an IGP advertisement from SR node 402 that maps nodal-segment ID 66 with loopback A, and SR/LDP node 408 mapped nodal-segment ID 66 to loopback A in memory. Using the common loopback A, SR/LDP node 408 can translate label L2 to nodal-segment ID 66 to facilitate transfer of packet P1 from the LSP to the SP. Once translated, SR/LDP node 408 may swap label L2 with the nodal-segment ID 66 and forward packet P1 towards egress node 402 using the process shown in FIG. 3.

The foregoing describes a process in which SR/LDP node 408 transfers a packet from an LSP to an SP. SR/LDP node 408 may also transfer a packet from an SP to an LSP. To illustrate, ingress SR node 402 may receive a packet P2, which is destined for a device that is reachable via node AE2. In response to receiving this packet, SR node 402 or a path computation node upon request, may determine a FEC (e.g., loopback E) for packet P2 based upon information such as the destination IP address within packet P2. SR node 402, or path computation node, upon request may then map loopback E to a segment ID stack for an SP. The segment stack may include a single segment ID or multiple segment IDs, at least one of which should be nodal-segment ID 78, which is mapped to loopback E by SR mapping node 420. For purposes of explanation only, the segment stack for packet P2 is presumed to include only on segment ID, i.e., nodal-segment ID 78. SR node 402 attaches nodal-segment ID 78 to packet P2, and forwards the packet to SR node 404 in accordance with the process shown in FIG. 3. SR node 404 receives packet P2 and nodal-segment ID 78, and forwards the packet and attached nodal-segment ID to SR/LDP node 408, which is the last SR enabled node in the illustrated example. SR/LDP node 408 receives packet P2 with attached nodal-segment ID 78, but cannot forward the packet via the SP. Acting as a merge point, however, SR/LDP node 408 can forward packet P2 on an LSP corresponding to the SP. More specifically, SR/LDP node 408 can select a label for an LSP corresponding to nodal-segment ID 78 using the FEC (e.g., loopback E) associated therewith. LDP peers, including SR/LDP node 408 and LDP node 412, exchange labels on a FEC-by-FEC bases during LSP creation. During a prior LDP session, LDP node 412 gave label L3 to SR/LDP node 408 when SR/LDP node 408 requested a label associated with loopback E, and SR/LDP node 408 mapped label L3 to loopback E in memory. Using the common loopback E, SR/LDP node 408 can translate nodal-segment ID 78 to label L3. Once translated, SR/LDP node 408 may swap nodal-segment ID 78 with label L3 and forward packet P2 to LDP node 412.

Figure 6:
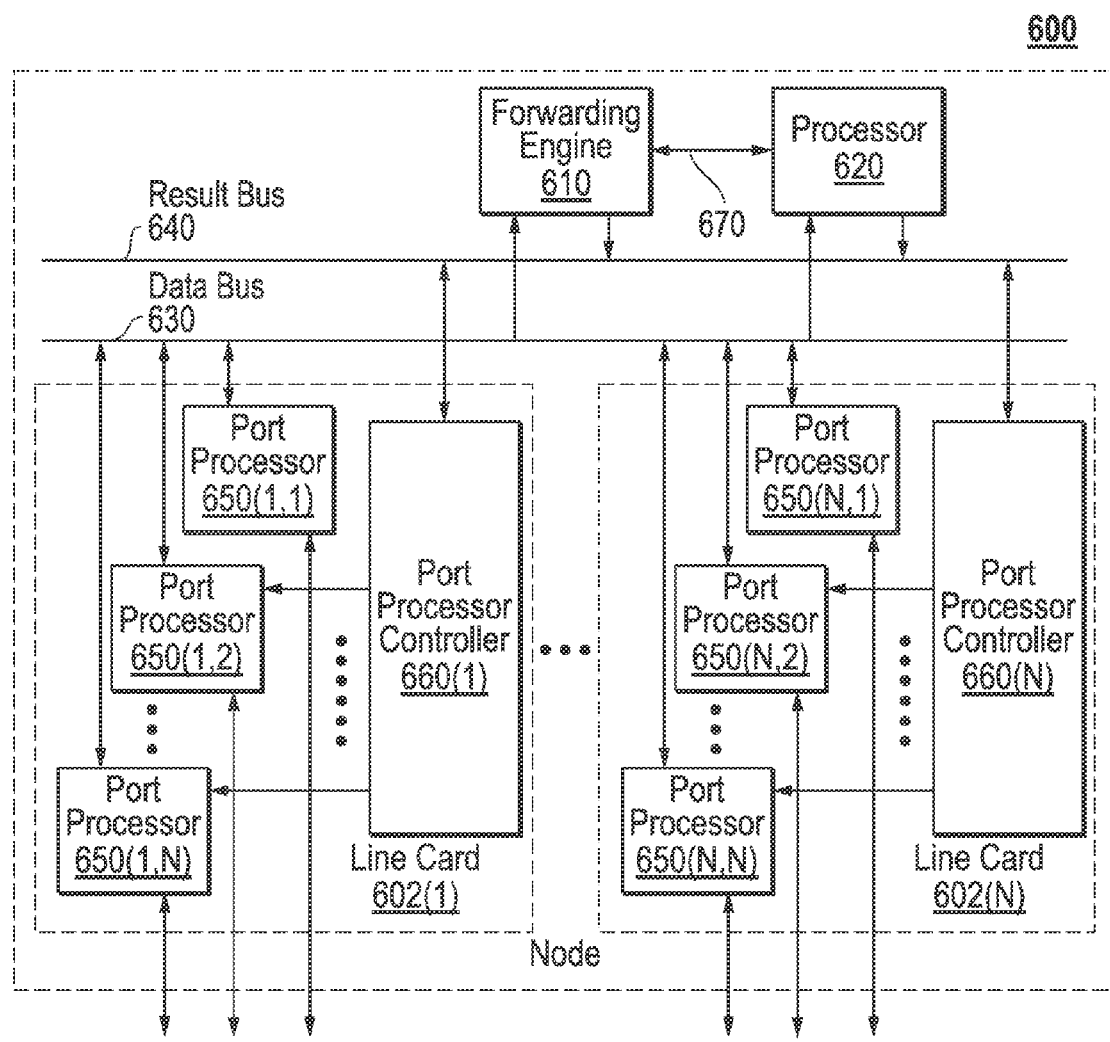
FIG. 6 is a block diagram illustrating certain components of an example node that can be employed in the network of FIGS. 1, 2, and 4.

FIG. 6 is a block diagram illustrating certain additional and/or alternative components of nodes that can be employed in the networks shown in FIG. 1, 2, or 4. In this depiction, node 600 includes a number of line cards (line cards 602(1)-(N)) that are communicatively coupled to a forwarding engine or packet forwarder 610 and a processor 620 via a data bus 630 and a result bus 640. Line cards 602(1)-(N) include a number of port processors 650(1,1)-(N,N) which are controlled by port processor controllers 660(1)-(N). It will also be noted that forwarding engine 610 and processor 620 are not only coupled to one another via data bus 630 and result bus 640, but are also communicatively coupled to one another by a communications link 670.

The processors 650 and 660 of each line card 602 may be mounted on a single printed circuit board. When a packet or packet and header are received, the packet or packet and header may be identified and analyzed by router 600 in the following manner. Upon receipt, a packet (or some or all of its control information) or packet and header is sent from the one of port processors 650(1,1)-(N,N) at which the packet or packet and header was received to one or more of those devices coupled to data bus 630 (e.g., others of port processors 650(1,1)-(N,N), forwarding engine 610 and/or processor 620). Handling of the packet or packet and header can be determined, for example, by forwarding engine 610. For example, forwarding engine 610 may determine that the packet or packet and header should be forwarded to one or more of port processors 650(1,1)-(N,N). This can be accomplished by indicating to corresponding one(s) of port processor controllers 660(1)-(N) that the copy of the packet or packet and header held in the given one(s) of port processors 650(1,1)-(N,N) should be forwarded to the appropriate one of port processors 650(1,1)-(N,N). In addition, or alternatively, once a packet or packet and header has been identified for processing, forwarding engine 610, processor 620 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   mapping a first node identifier (ID) to a first segment ID in memory, wherein the first node ID uniquely identifies a first node within a network domain, and wherein the first node is not segment routing (SR) enabled;
   generating and transmitting a message directly or indirectly to another node within the network domain, wherein the message comprises the first node ID mapped to the first segment ID, wherein the other node is SR enabled.

2. The method of claim 1 wherein the message comprises a range of node IDs mapped to a range of segment IDs, wherein the range of node IDs comprises the first node ID, wherein the range of segment IDs comprises the first segment ID, and wherein each of the node IDs in the range of node IDs, uniquely identifies a respective node in the network domain.

3. The method of claim 1 wherein the message comprises a range of node IDs mapped to a range of segment IDs, wherein the range of node IDs comprises the first node ID, wherein the range of segment IDs comprises the first segment ID, and wherein each of the node IDs in the range node IDs, uniquely identifies a respective, non SR enabled node in the network domain.

4. The method of claim 1 wherein the message comprises a range of node IDs mapped to a range of segment IDs, wherein the range of node IDs comprises the first node ID, wherein the range of segment IDs comprises the first segment ID, wherein a second of the node IDs within the range of node IDs, uniquely identifies a second node in the network domain, wherein the second node is SR enabled.

5. The method of claim 1 wherein the message comprises a second node ID mapped to a second segment ID, wherein the second node ID uniquely identifies a second node within the network domain, and wherein the second node is not SR enabled.

6. The method of claim 5 wherein the message comprises a third node ID mapped to a third segment ID, wherein the third node ID uniquely identifies a third node within the network domain, and wherein the third node is SR enabled.

7. The method of claim 1 further comprising:
   the other node receiving a packet with the first segment ID attached to it;
   the other node accessing a table to read an interface identifier that is mapped in the table to the first segment ID, wherein the interface identifier identifies an interface of the other node;
   the other node forwarding the packet with the attached first segment ID to a next hop node via the interface.

8. A non-transitory computer readable medium (CRM) comprising executable instructions, wherein a node in a network domain implements a method in response to executing the instructions, the method comprising;
   receiving a message that comprises first and second node IDs mapped to first and second segment IDs, respectively, wherein the first and second node IDs uniquely identify first and second nodes, respectively, within an autonomous network domain, and wherein the first and second nodes are not SR enabled;
   mapping the first and second segment IDs to first and second interface identifiers, respectively, of the node, wherein the node is SR enabled.

9. The non-transitory CRM of claim 8 wherein the message comprises a range of node IDs mapped to a range of segment IDs, wherein the range of node IDs comprises the first node ID, wherein the range of segment IDs comprises the first segment ID, and wherein each of the node IDs in the range of node IDs, uniquely identifies a respective node in the network domain.

10. The non-transitory CRM of claim 8 wherein the message comprises a range of node IDs mapped to a range of segment IDs, wherein the range of node IDs comprises the first node ID, wherein the range of segment IDs comprises the first segment ID, and wherein each of the node IDs in the range node IDs, uniquely identifies a respective, non SR enabled node in the network domain.

11. The non-transitory CRM of claim 8 wherein the message comprises a third node ID mapped to a third segment ID, wherein the third node ID uniquely identifies a third node within the network domain, and wherein the third node is SR enabled.

12. The non-transitory CRM of claim 8 wherein the method further comprises:
   receiving a first packet with the first segment ID attached to it;
   accessing a table to read the first interface identifier that is mapped in the table to the first segment ID, wherein the first interface identifier identifies a first interface of the node;
   forwarding the first packet with the attached first segment ID to a next hop node via the first interface.

13. The non-transitory CRM of claim 12 wherein the method further comprises:
- receiving a second packet with the second segment ID attached to it;
- accessing the table to read the second interface identifier that is mapped in the table to the second segment ID, wherein the second interface identifier identifies a second interface of the node;
- forwarding the second packet with the attached second segment ID to another next hop node via the second interface.

14. The non-transitory CRM of claim 8 wherein the first and second nodes are LDP enabled.

15. An apparatus comprising:
- a means for mapping a first node identifier (ID) to a first segment ID, wherein the first node ID uniquely identifies a first node within a network domain, and wherein the first node is not segment routing (SR) enabled;
- a means for generating and transmitting a message directly or indirectly to another node within the network domain, wherein the message comprises the first node ID mapped to the first segment ID, wherein the other node is SR enabled.

16. The apparatus of claim 15 wherein the message comprises a range of node IDs mapped to a range of segment IDs, wherein the range of node IDs comprises the first node ID, wherein the range of segment IDs comprises the first segment ID, and wherein each of the node IDs in the range of node IDs, uniquely identifies a respective node in the network domain.

17. The apparatus of claim 15 wherein the message comprises a range of node IDs mapped to a range of segment IDs, wherein the range of node IDs comprises the first node ID, wherein the range of segment IDs comprises the first segment ID, and wherein each of the node IDs in the range node IDs, uniquely identifies a respective, non SR enabled node in the network domain.

18. The apparatus of claim 15 wherein the message comprises a range of node IDs mapped to a range of segment IDs, wherein the range of node IDs comprises the first node ID, wherein the range of segment IDs comprises the first segment ID, wherein a second of the node IDs within the range of node IDs, uniquely identifies a second node in the network domain, wherein the second node is SR enabled.

19. The apparatus of claim 15 wherein the message comprises a second node ID mapped to a second segment ID, wherein the second node ID uniquely identifies a second node within the network domain, and wherein the second node is not SR enabled.

20. The apparatus of claim 19 further comprising:
- the other node, wherein the other node comprises:
- a means for receiving the message;
- a means for mapping the first and second segment IDs to first and second interface identifiers, respectively, of the other node.

* * * * *